United States Patent
Uesugi et al.

(10) Patent No.: US 6,869,212 B2
(45) Date of Patent: Mar. 22, 2005

(54) ROTOR/STATOR TYPE HOMOGENIZER

(75) Inventors: Masakazu Uesugi, Yamanashi (JP);
Masahiro Tsunofuri, Yamanashi (JP);
Jun Nagano, Yamanashi (JP); Shotaro Mizobuchi, Yamanashi (JP)

(73) Assignee: THK Co., Ltd., Tokyo (JP)

( * ) Notice: Subject to any disclaimer, the term of this patent is extended or adjusted under 35 U.S.C. 154(b) by 114 days.

(21) Appl. No.: 10/353,034

(22) Filed: Jan. 29, 2003

(65) Prior Publication Data

US 2003/0147302 A1 Aug. 7, 2003

(30) Foreign Application Priority Data

Feb. 6, 2002 (JP) ........................................ 2002-029105

(51) Int. Cl.⁷ .................................................. B01F 5/12
(52) U.S. Cl. .............................. 366/164.6; 366/169.2; 366/264; 384/113
(58) Field of Search ........................... 366/164.2, 164.6, 366/169.2, 264; 384/107, 111, 113–115, 118, 120

(56) References Cited

U.S. PATENT DOCUMENTS

| | | | | |
|---|---|---|---|---|
| 2,696,410 A | * | 12/1954 | Topanelian, Jr. ............ | 384/107 |
| 3,549,216 A | * | 12/1970 | Sutyak ......................... | 384/115 |
| 3,560,062 A | * | 2/1971 | Kun et al. ................... | 384/115 |
| 4,793,713 A | * | 12/1988 | King ......................... | 366/181.8 |
| 5,274,286 A | * | 12/1993 | Yamamura ................ | 310/67 R |
| 5,511,877 A | * | 4/1996 | King ......................... | 366/169.2 |
| 6,368,052 B2 | | 4/2002 | Uesugi et al. | |
| 2003/0030225 A1 | | 2/2003 | Uesugi et al. | |

OTHER PUBLICATIONS

KINEMATICA Products http://www.kinematica.ch/Englisch/Prod_en/Prod en.html.

* cited by examiner

*Primary Examiner*—David Sorkin
(74) *Attorney, Agent, or Firm*—Rader, Fishman & Grauer PLLC

(57) ABSTRACT

Disclosed is a rotor/stator type homogenizer which allows the gap between the rotor and the stator to be set to a very small dimension and which does not involve generation of abrasion particles or the like even if the rotor is rotated at high speed, making it possible to efficiently homogenize a plurality of liquids having no mutual compatibility. The inner peripheral surface of the stator and the outer peripheral surface of the rotor are opposed to each other through a predetermined gap and a portion of the solutions is introduced into the gap to form a hydrodynamic bearing, thereby supporting rotation of the rotor with respect to the stator.

6 Claims, 7 Drawing Sheets

Solutions

ROTOR/STATOR TYPE HOMOGENIZER

BACKGROUND OF THE INVENTION

1. Field of the Invention

The present invention relates to a homogenizer used, for example, to mechanically mix and agitate a plurality of liquids having no mutual compatibility to obtain an emulsion. In particular, the present invention relates to an improvement of a so-called rotor/stator type homogenizer in which a rotor is rotated at high speed inside a stator having a plurality of radially formed flow passages to thereby effect mixing and agitating by utilizing a shearing force generated between the stator and the rotor.

2. Description of the Related Art

Homogenizers are used to mechanically mix and agitate a plurality of liquids having no mutual compatibility as in the case of water and oil to thereby homogenize them into an emulsion. They are frequently used in production equipment for foods, chemical products, or the like, experimental plants, etc. Conventionally, there are known homogenizers of various structures, including what is called a rotor/stator type homogenizer.

The rotor/stator type homogenizer comprises a cylindrical stator fixed in position inside an agitation chamber and a rotor which is accommodated in a hollow of the stator and to which a predetermined r.p.m is imparted by a motor, the stator and rotor having a plurality of radially formed flow passages. Two liquids having no mutual compatibility are supplied to the hollow of the rotor by a pump provided separately from the homogenizer. When the rotor starts to rotate in the state where these liquids are being supplied, a centrifugal force is applied to the liquids, which are ejected from the radial flow passages formed in the rotor to enter the gap between the rotor and stator, entering radial flow passages of the stator. The stator does not rotate but remains stationary, so that when the rotor starts to rotate, a vortex flow is generated in the liquids existing in the radial flow passages of the rotor and the stator. Further, a shearing force in conformity with the r.p.m of the rotor is applied to the liquids having entered the gap between the rotor and the stator. Due to the energy of the vortex flow and the shearing force, the two liquids are homogenized and eventually discharged as an emulsion to the exterior through the radial flow passages formed in the stator.

To more efficiently homogenize the two liquids in this rotor/stator type homogenizer, it is important to apply a great shearing force to the liquids introduced into the gap between the rotor and the stator. For this purpose, it is important to set the gap defined between the inner peripheral surface of the stator and the outer peripheral surface of the rotor to be small, and to increase the rotor r.p.m.

However, in the conventional rotor/stator type homogenizer, the rotor rotation is supported by a ball bearing or a sliding bearing, so that when the rotor rotation accuracy, etc. are taken into account, it is impossible to set the gap between the stator and the rotor to be very small, the lower limit size of the gap being approximately 40 $\mu$m. Further, when the rotor rotates at high speed, there is the problem of wear of the bearing. To prevent particles generated as a result of the wear from mixing into the target emulsion, it is necessary to avoid operation at excessively high speed. The upper limit in operation speed is thus approximately 30000 rpm.

SUMMARY OF THE INVENTION

The present invention has been made in view of the above problems in the prior art. It is an object of the present invention to provide a rotor/stator type homogenizer which allows the gap between the rotor and the stator to be set to a very small value and which does not involve generation of foreign matter such as abrasion particles even if the rotor is rotated at high speed, making it possible to efficiently homogenize a plurality of liquids having no mutual compatibility.

In order to attain the above-mentioned object, a rotor/stator type homogenizer according to the present invention includes: a cylindrical stator in which a plurality of flow passages are radially formed; and a cylindrical rotor in which a plurality of flow passages are also radially formed and which rotates in a hollow of the stator. The rotor-stator type homogenizer has such a feature that solutions supplied to a hollow of the rotor are mixed together and agitated as the rotor rotates and recovered from outside the stator, and that an inner peripheral surface of the stator and an outer peripheral surface of the rotor are opposed to each other through a predetermined gap and a portion of the solutions is introduced into the gap to form a hydrodynamic bearing, thereby supporting the rotation of the rotor with respect to the stator.

In the homogenizer of the present invention constructed as described above, the stator and the rotor are opposed to each other through a predetermined gap (bearing gap) to form the hydrodynamic bearing. Thus, when a portion of the solutions is introduced into the bearing gap and the rotor is rotated, dynamic pressure is generated in the solutions in the bearing gap, making it possible to support the rotation of the rotor in a floating state with respect to the stator. At this time, high-pressure solutions exist around the rotor in the form of a lubricant film, so that the rotor does not come into contact with the stator, making it possible to make the bearing gap of the hydrodynamic bearing, that is, the gap between the outer peripheral surface of the rotor and the inner peripheral surface of the stator, very small. For example, when the rotation of the rotor is supported by means of a ball bearing, a gap of several tens of $\mu$m is required as stated above, whereas when the rotation of the rotor is supported by a hydrodynamic bearing, a gap of several $\mu$m suffices. Thus, in the homogenizer of the present invention, it is possible to apply a greater shearing force to the solutions entering the gap between the stator and the rotor as compared with the prior art.

Further, when the rotation of rotor is supported by a hydrodynamic bearing, the rotor is in a floating state with respect to the stator, so that no dust or the like due to wear is generated even if the rotor is rotated at high speed, making it possible to always keep the solutions passing through the flow passages of the rotor and stator clean. Thus, it is possible to increase the rotating speed of the rotor so that the rotor can make a high speed rotation of 50000 rpm or more, thus providing a very efficient homogenizer.

DESCRIPTION OF THE PREFERRED EMBODIMENT

The rotor/stator type homogenizer of the present invention will now be described in detail with reference to the accompanying drawings.

Figure 1:
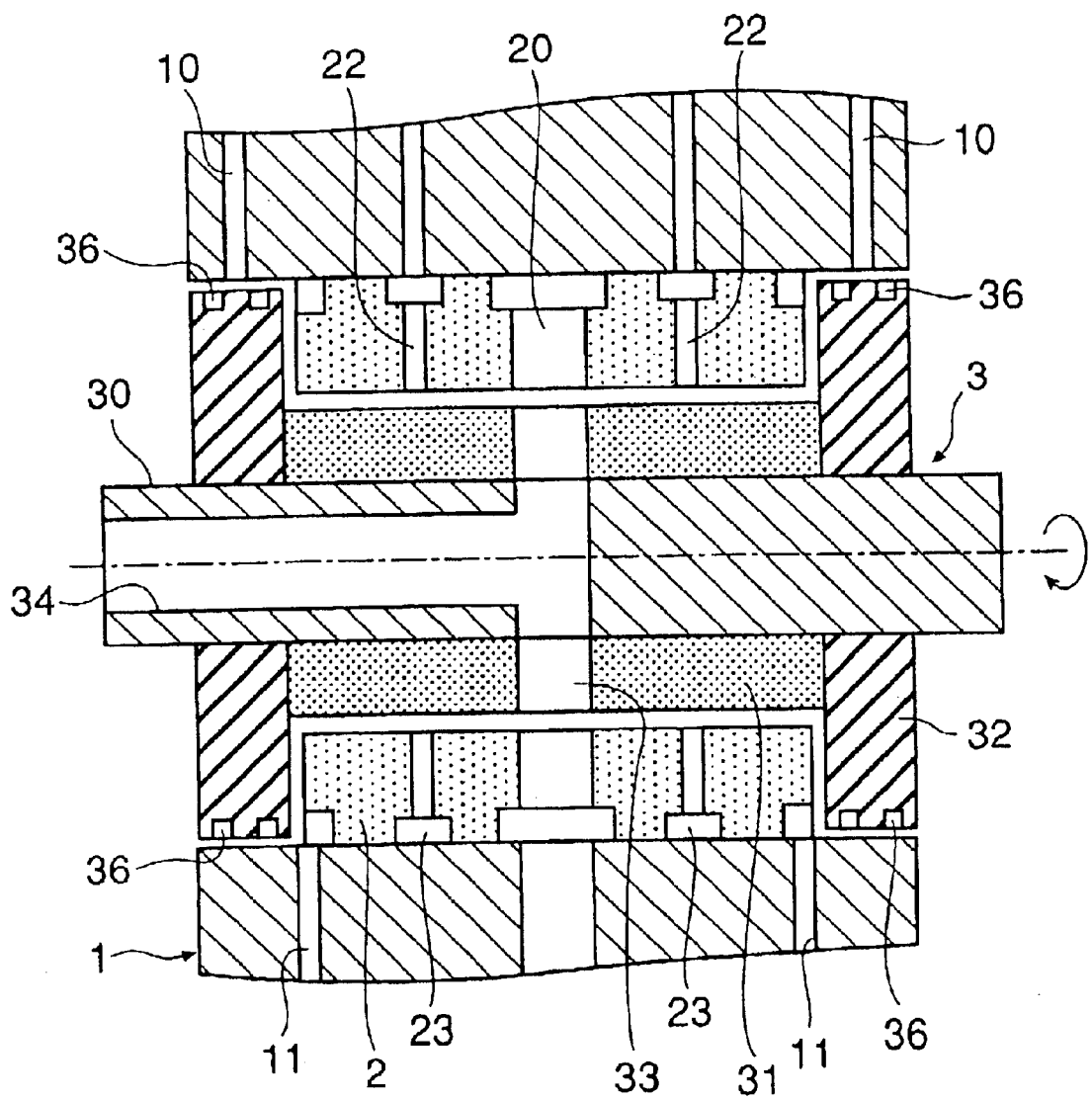
FIG. 1 is a sectional view of a rotor/stator type homogenizer according to an embodiment of the present invention.

FIG. 1 shows an example of a homogenizer to which the present invention is applied. This homogenizer sucks in a plurality of liquids having no mutual compatibility and mixes and agitates them to change them into a homogenized emulsion. It comprises a substantially cylindrical stationary housing 1, a cylindrical stator 2 secured in position in a hollow of the stationary housing 1, and a rotor 3 rotatably provided in a hollow of the stator 2.

Figure 2:
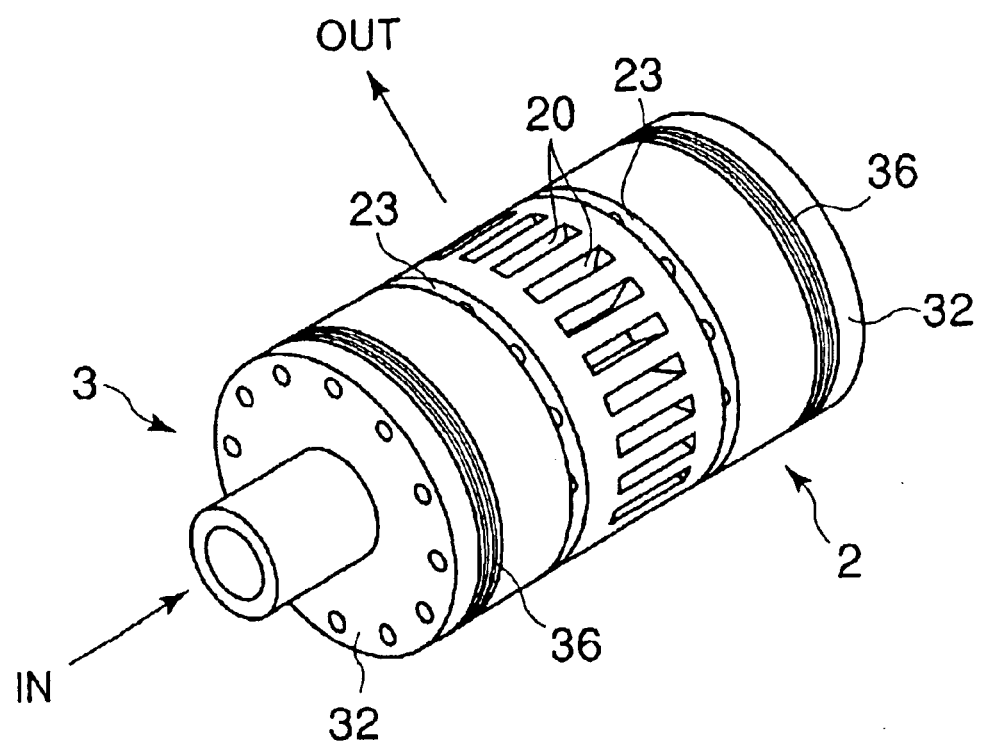
FIG. 2 is a perspective view showing how the rotor and stator of the embodiment are combined.
Figure 3:
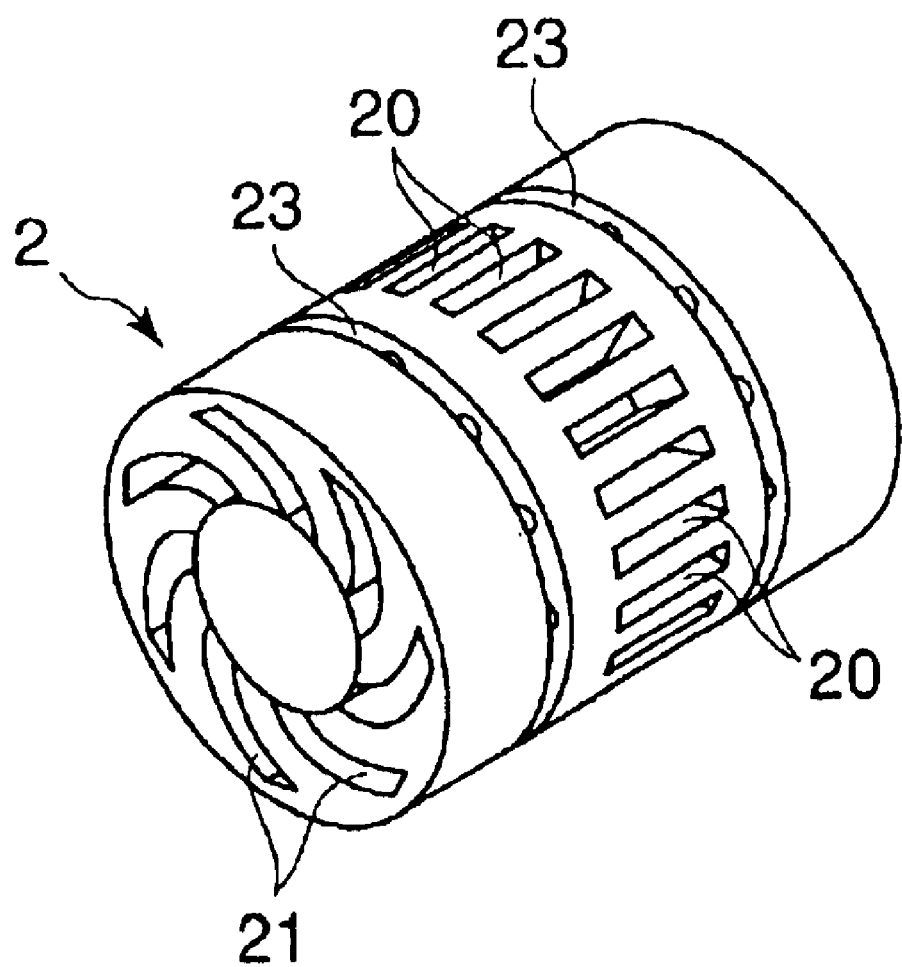
FIG. 3 is a perspective view of the stator of the embodiment.

FIG. 2 is a perspective view showing the outward appearance of the stator 2 and the rotor 3, with the stationary housing 1 removed. FIG. 3 is a perspective view of the stator 2. The stator 2 is formed as a cylinder using a fine ceramic material such as silicon carbide, silicon nitride, zirconia, or alumina. In the middle portion of the stator 2 with respect to the axial direction thereof, there are circumferentially provided a plurality of radial agitation flow passages 20 establishing communication between the inner peripheral surface and the outer peripheral surface thereof. Further, in the axial end surfaces of the stator 2, there are formed spiral dynamic pressure generating grooves 21 having a depth of approximately 5 $\mu$m. The stator 2 forms a pair of thrust hydrodynamic bearings together with the rotor 3 described below.

Figure 4:
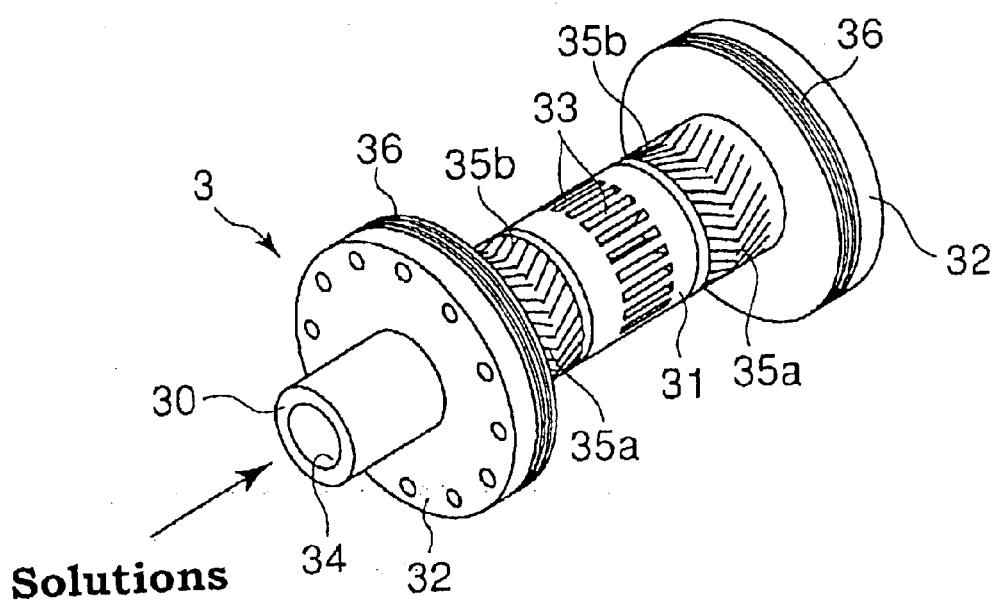
FIG. 4 is a perspective view of the rotor of the embodiment.

FIG. 4 is a perspective view of the rotor 3. The rotor 3 comprises a rotation shaft 30 rotated by a motor (not shown), a cylindrical bearing sleeve 31 fixed to the outer peripheral surface of the rotation shaft 30, and a pair of thrust discs 32 which is fixed to the rotation shaft 30 so as to sandwich the bearing sleeve 31 from either side thereof with respect to the axial direction. The stator 2 is fitted with play between the pair of thrust discs 32. As in the stator 2, the bearing sleeve 31 and the thrust discs 32 are formed of a fine ceramic material such as silicon carbide, silicon nitride, zirconia, or alumina.

At the axial center of the bearing sleeve 31, there are circumferentially arranged a plurality of radial agitation flow passages 33 establishing communication between the inner peripheral surface and the outer peripheral surface thereof. The agitation flow passages 33 of the bearing sleeve 31 are opposed to the agitation flow passages 20 of the stator 2. Further, the rotation shaft 30 is equipped with a supply flow passage 34 for supplying solutions to the agitation flow passages 33 of the bearing sleeve 31. The solutions agitated by this homogenizer are supplied in the axial direction from the supply flow passage 34, and radially pass through the agitation flow passages 33 of the bearing groove 31.

The inner peripheral surface of the stator 2 and the outer peripheral surface of the bearing sleeve 31 are opposed to each other through a predetermined bearing gap. These components cooperate to form radial hydrodynamic bearings. Formed in the outer peripheral surface of the bearing sleeve 31 are four rows of dynamic pressure generating grooves 35a and 35b inclined in predetermined directions with respect to the rotation shaft 30. When the bearing sleeve 31 rotates together with the rotation shaft 30, there is formed in the gap between the bearing sleeve 31 and the stator 2, that is, the bearing gaps of the radial hydrodynamic bearings, high pressure fluid lubricant films, by means of which the rotation of the bearing sleeve 31 is supported in a non-contact state with respect to the stator 2. Of the four rows of dynamic pressure generating grooves 35a and 35b, the two rows of dynamic pressure generating grooves 35a situated at the axial ends pressurize the lubricant fluid existing in the bearing gap toward the axial ends, that is, toward the pair of thrust discs 32, as the bearing sleeve 31 rotates. Further, the two rows of dynamic pressure generating grooves 35b situated at the axial center pressurize the lubricant fluid existing in the bearing gap toward the axial center, that is, toward the agitation flow passages 33, as the bearing sleeve 31 rotates.

Further, the thrust discs 32 fixed to the rotation shaft 30 cooperate with the stator 2 to form a thrust hydrodynamic bearing, and sandwich the stator 2 from either side thereof with respect to the axial direction. Between the thrust discs 32 and the end surfaces of the stator 2, there are formed predetermined bearing gaps (e.g., 9 $\mu$m), which communicate with the bearing gaps of the radial hydrodynamic bearings. As stated above, the spiral dynamic pressure generating grooves 21 are formed in the axial end surfaces of the stator 2 opposed to the thrust discs 32. These spiral dynamic pressure generating grooves 21 are formed as a so-called pump-out type structure which discharges the lubricant fluid in the bearing gaps radially from inside toward outside as the thrust discs 32 rotate. Thus, when the thrust discs 32 rotate together with the rotation shaft 30, a high pressure fluid lubricant film is formed in the bearing gap of each thrust hydrodynamic bearing, regulating axial movement of the rotation shaft 30 with respect to the stator 2.

In order to prevent foreign matter from being mixed into the emulsified solution obtained by this homogenizer, a portion of the solutions supplied from the supply flow passage 34 is used as the lubricant fluid to be supplied to the bearing gaps of the radial hydrodynamic bearings and the thrust hydrodynamic bearings. The lubricant fluid is sucked into the bearing gaps of the radial hydrodynamic bearings through a plurality of suction inlets 22 formed in the stator 2 (See FIG. 1). The suction inlets 22 are formed radially with respect to the stator 2, and communicate with annular grooves 23 formed in the outer peripheral surface of the stator 2 (See FIGS. 2 and 3). Further, these suction inlets 22 are open on the bearing gaps of the radial hydrodynamic bearings in correspondence with the middle positions of the dynamic pressure generating grooves 35a and 35b formed in the bearing sleeve 31. Thus, when the rotation shaft 30 starts to rotate, the lubricant fluid is sucked into the bearing gaps of the radial hydrodynamic bearings through the annual grooves 23 and the suction inlets 22, forming high pressure fluid lubricant films. A portion of the lubricant fluid sucked into the bearing gaps of the radial hydrodynamic bearings is pressurized toward the thrust discs 32 by the action of the dynamic pressure generating grooves 35a, and the remaining lubricant fluid is pressurized in directions opposite to the thrust discs 32 by the action of the dynamic pressure generating grooves 35b.

In the bearing gaps of the thrust hydrodynamic bearings, the lubricant fluid coming from the bearing gaps of the radial hydrodynamic bearings as stated above is pressurized radially outwards with respect to the thrust discs 32 as the rotor 3 rotates, and is eventually discharged to the exterior of the bearings from the outer peripheral edges of the thrust discs 32. To prevent the lubricant fluid having reached the outer peripheral edges of the thrust discs 32 from leaking to the exterior through the gaps between the thrust discs 32 and the stationary housing 1, the outer peripheral surfaces of the thrust discs 32 face the stationary housing 1 through small gaps of approximately 0.1 mm, and annular grooves 36 are formed in the outer peripheral surfaces, thereby forming labyrinth seals. Further, pressurized air is blown into the gaps of these labyrinth seals from passages 10 formed in the stationary housing 1, and leakage of the lubricant fluid to the exterior is prevented by this pressurized air and the labyrinth seals. And, the lubricant fluid having reached the outer peripheral edges of the thrust discs 32 joins the pressurized air, and is discharged to the exterior through discharge passages 11 formed in the stationary housing 1. The discharged lubricant fluid, that is, the solutions, is recovered and reused as lubricant fluid.

Figure 5:
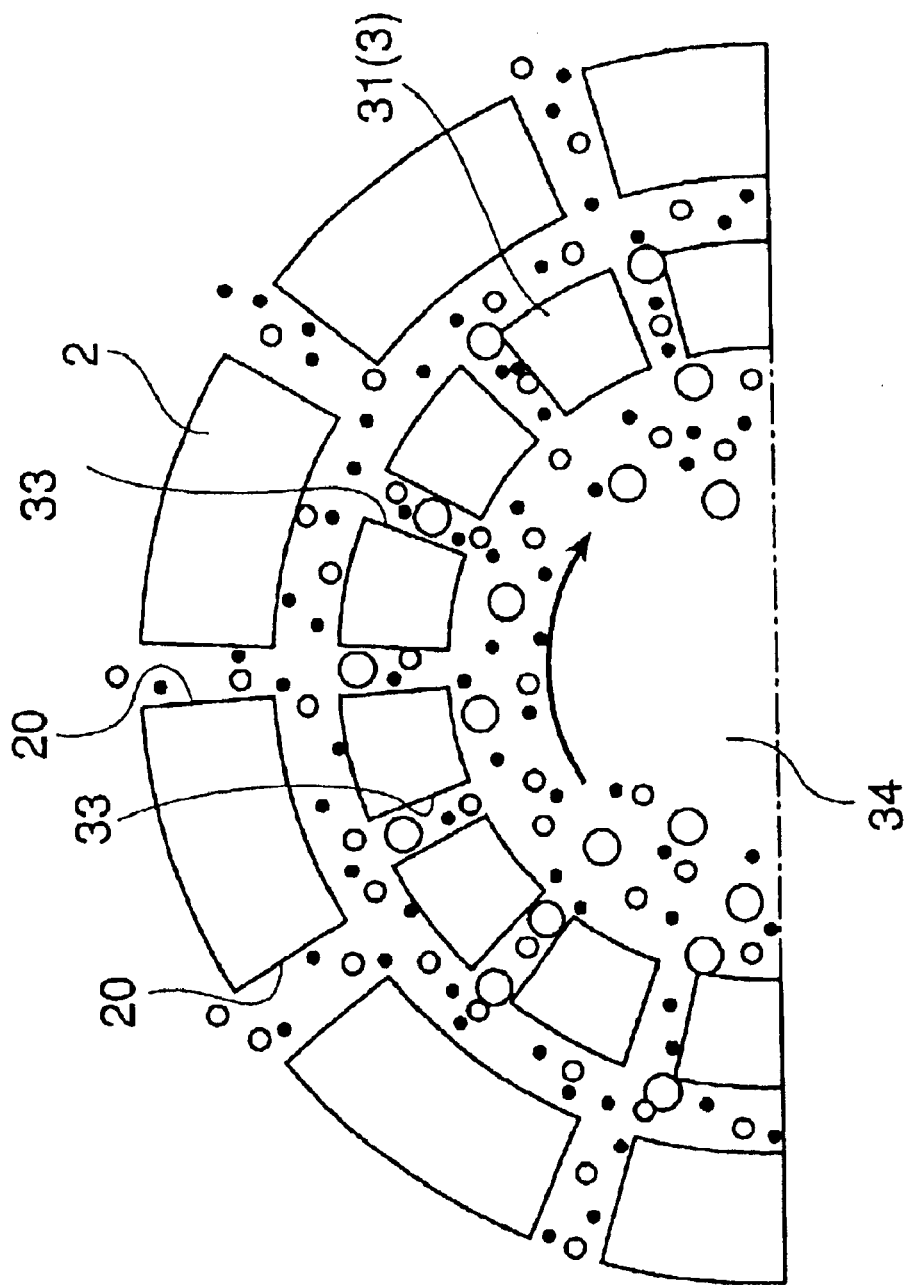
FIG. 5 is an enlarged sectional view showing the relationship between the agitation flow passage of the rotor and the agitation flow passage of the stator.

When the homogenizer of this embodiment, constructed as described above, is used, a plurality of liquids having no mutual compatibility are supplied from the supply passage 34 formed in the rotation shaft 30 of the rotor 3, and the rotor 3 is rotated in a fixed direction by a motor (not shown). FIG. 5 is an enlarged sectional view showing the positional relationship between the agitation flow passages of the stator 2 and the rotor 3. In the drawing, the hollow dots indicate a first solution, and the solid dots indicate a second solution. The first and second solutions supplied from the supply flow passage 34 of the rotor 3 have no mutual compatibility, so that they reach the agitation flow passages 33 provided in the rotor 3 without being dissolved in each other. Since the rotor 3 is rotating, these solutions enter the agitation flow passages 33 by the centrifugal force, and further, the agitation flow passages 20 of the opposing stator 2. The stator 2 does not rotate but remains stationary, so that a vortex flow is generated in the solutions in the agitation flow passages 33 and 20 of the rotor 3 and the stator 2. Further, a shearing force is applied to the solutions in the gap between the rotor 3 and the stator 2, and the first and second solutions are mixed and agitated by the energy of the vortex flow and the energy of the shearing force. Eventually, an emulsion in which the first and second solutions are homogenized is obtained at the discharge flow passage 12 provided in the stationary sleeve 1.

In the homogenizer of this embodiment, the rotation of the rotor with respect to the stator is supported by the hydrodynamic bearings, so that it is possible to make the gap between the stator and the rotor as small as approximately several $\mu$m, and with such a gap, it is possible to markedly enhance the energy of the shearing force applied to the first and second solutions. Further, when the rotation of the rotor is supported by a hydrodynamic bearing, the rotating rotor is in a non-contact state with respect to the stator, so that even when the rotor rotates at high speed, no abrasion dust is generated in the bearing, and there is no fear of foreign matter being mixed into the solutions. Thus, it is possible to markedly increase the r.p.m of the rotor when using the homogenizer. This also helps to enhance the energy acting on the mixing and agitation of the first and second solutions, thereby promoting the emulsification of the two solutions.

For example, in the homogenizer of this embodiment, 20 agitation flow passages are radially provided in the rotor, and 30 agitation flow passages are radially provided in the stator. By rotating the rotor at 60000 rpm, it is possible to impart energy of a high frequency of 1.2 MHz to both solutions to there by homogenize them.

Further, in this embodiment, the pair of hydrodynamic bearings are provided so as to be adjacent to the agitation flow passages of the rotor and the stator, so that the gap between the rotor and the stator is sealed by the high pressure fluid lubricant films generated in the bearing gaps of the radial hydrodynamic bearings, whereby it is possible to seal the gap between the rotor and the stator without providing any mechanical seal. This helps to avoid problems that would be involved if a mechanical sealing device were used, that is, a deterioration in sealing function with the passage of time, and generation of abrasion dust with the rotation of the rotor.

Figure 6:
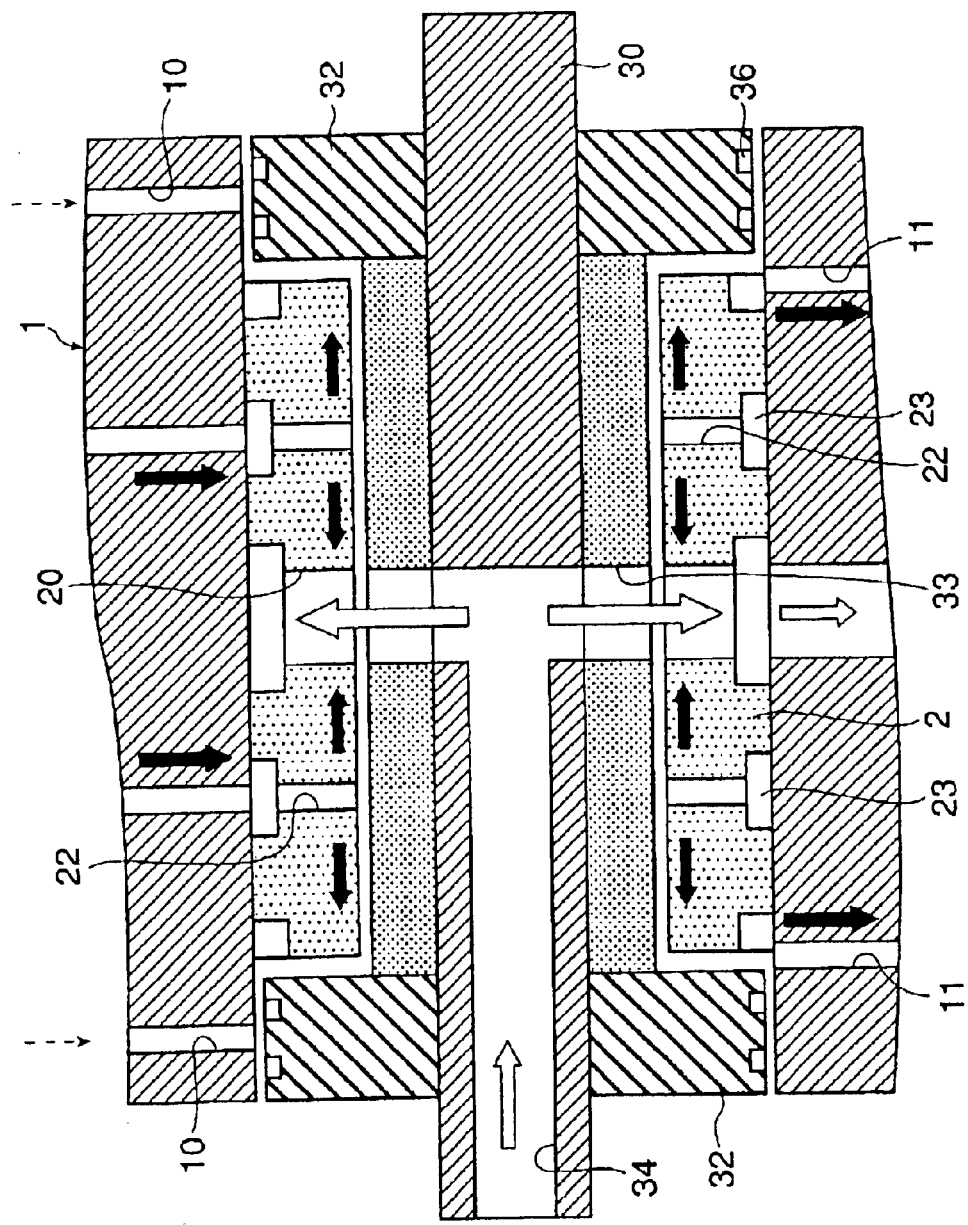
FIG. 6 is a sectional view showing the flow of solution, lubricant fluid, and air in the interior of the homogenizer of the embodiment.

FIG. 6 illustrates how the solutions, the lubricant fluid, and air flow in the homogenizer of this embodiment. The hollow arrows indicate the flow of the solutions, the solid arrows indicate the flow of the lubricant fluid, and the broken-line arrows indicate the flow of air.

Figure 7:
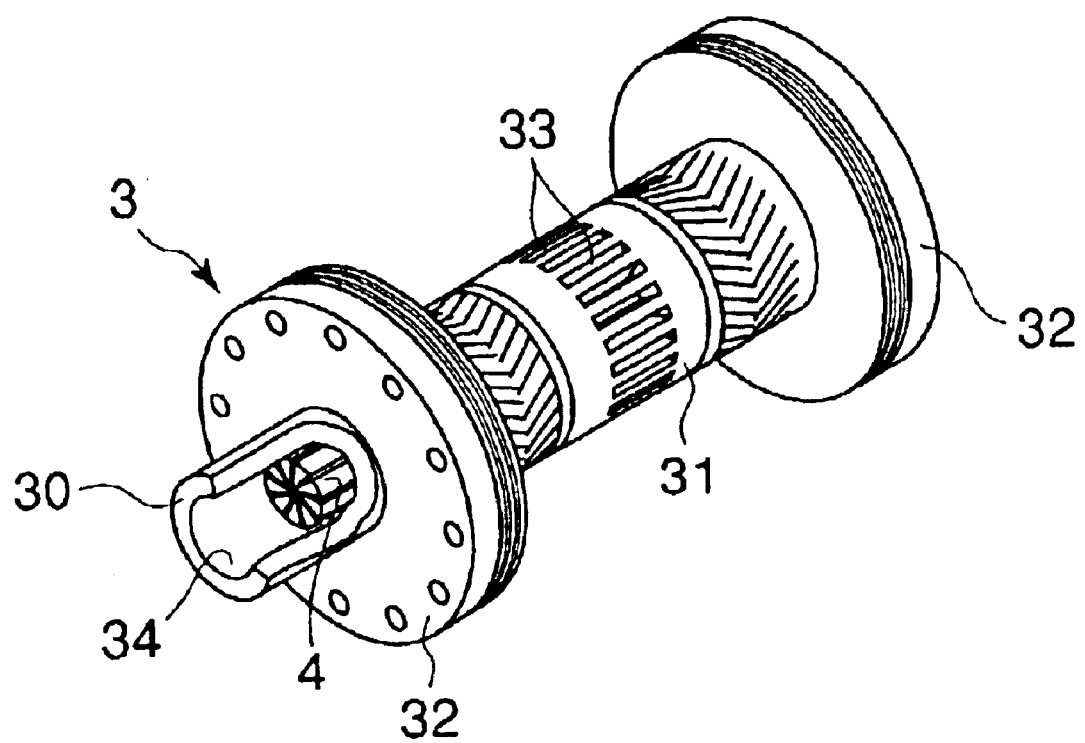
FIG. 7 is a perspective view showing the rotor of the embodiment with pump vanes attached thereto.

While in the homogenizer of this embodiment a pump device for supplying solutions to the supply flow passage 34 of the rotor 3 is separately provided, it is also possible, as shown in FIG. 7, to provide pump vanes 4 in the supply flow passage 34. As the rotor 3 rotates, the pump vanes 4 suck the solutions into the supply flow passage 34 and supply them to the agitation flow passages 33.

As described above, in the rotor/stator type homogenizer of the present invention, the rotation of the rotor with respect to the stator is supported by hydrodynamic bearings, so that it is possible to make the gap between the outer peripheral surface of the rotor and the inner peripheral surface of the stator very small, whereby it is possible to apply a greater shearing force to the solutions having entered the gap between the stator and the rotor as compared with the prior art. Further, since the rotation of the rotor is supported in a non-contact state with respect to the stator, no foreign matter such as abrasion particles is generated by the rotation of the rotor, so that it is possible to mix and agitate the solutions by rotating the rotor at very high speed, whereby a plurality of liquids having no mutual compatibility can be homogenized very efficiently.

What is claimed is:

1. A rotor/stator type homogenizer comprising:

a stator which is formed in a cylindrical shape with a hollow and has a plurality of flow passages radially formed therein; and a rotor which is formed in a cylindrical shape with a hollow shaft defining a supply flow passage and has a plurality of flow passages radially formed therein in communication with the supply flow passage, in which solutions are supplied to the supply flow passage and the flow passages of the rotor, the rotor rotating in the hollow of the stator, wherein an inner peripheral surface of the stator and an outer peripheral surface of the rotor are opposed to each other through a predetermined gap and a portion of the solutions is introduced into the gap to form a hydrodynamic bearing, thereby supporting rotation of the rotor with respect to the stator, and wherein the solutions supplied to the supply flow passage and the flow passages of the rotor are mixed together and agitated as the rotor rotates to be recovered from outside the stator.

2. A rotor/stator type homogenizer according to claim 1, wherein a pair of dynamic pressure generating grooves are formed in the inner peripheral surface of the stator or the outer peripheral surface of the rotor, with the flow passages therebetween, and wherein the dynamic pressure generating grooves are formed in a pattern so that the solutions in a bearing gap formed by the stator and the rotor are pressurized toward the flow passages as the rotor rotates.

3. A rotor/stator type homogenizer according to claim 2, wherein the flow passages of the rotor and the flow passages of the stator are opposed to each other through the gap of the radial hydrodynamic bearing.

4. A rotor/stator type homogenizer according to claim 1, wherein the inner peripheral surface of the stator and the outer peripheral surface of the rotor are opposed to each other through a predetermined gap so that the stator and the rotor form a radial hydrodynamic bearing.

5. A rotor/stator type homogenizer according to claim 4, wherein the flow passages of the rotor and the flow passages of the stator are opposed to each other through the gap of the radial hydrodynamic bearing.

6. A rotor/stator type homogenizer according to claim 1, wherein the rotor is equipped with integrally formed pump vanes for supplying the solutions into the hollow thereof.

* * * * *